May 23, 1950     L. F. MOTE     2,508,963
COOKING UTENSIL
Filed July 6, 1948
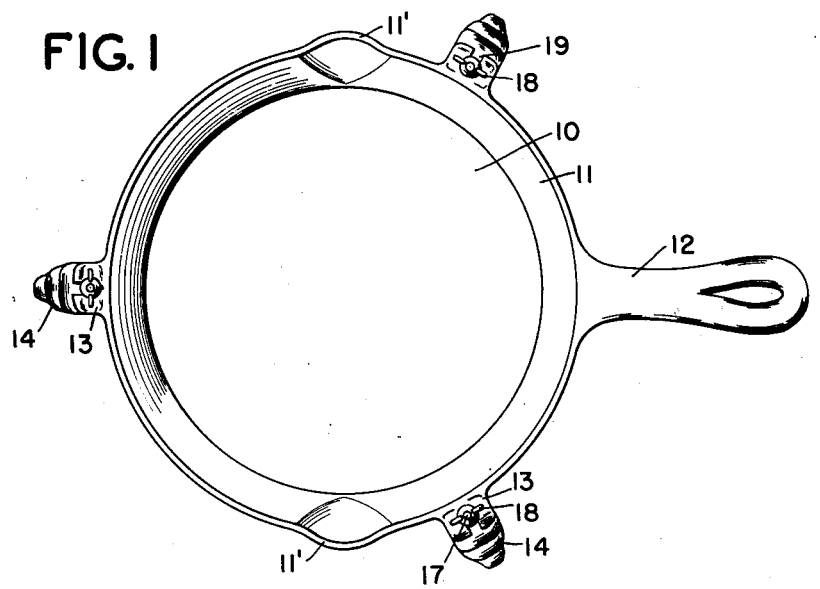
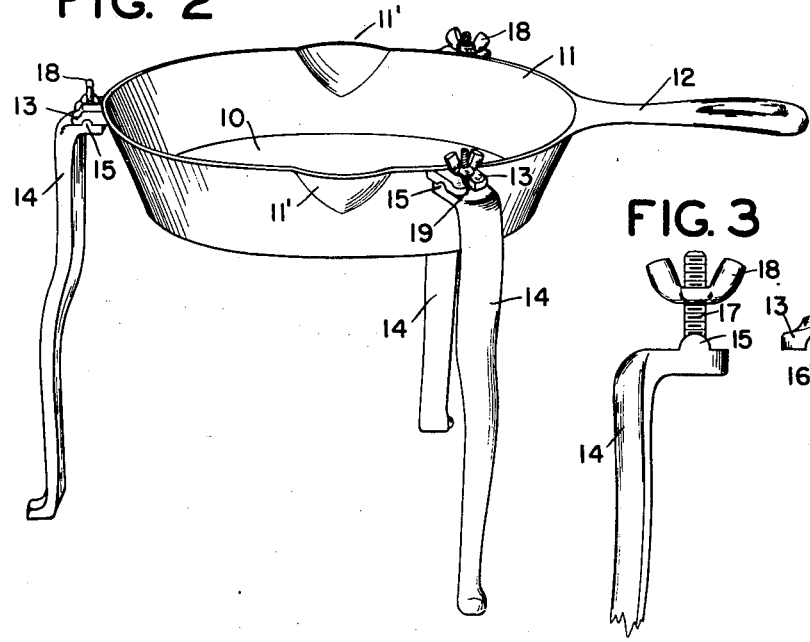
*INVENTOR.*
LOUIS F. MOTE
BY Edw. T. Newton
ATTORNEY Patented May 23, 1950

2,508,963

UNITED STATES PATENT OFFICE 2,508,963

COOKING UTENSIL

Louis F. Mote, Atlanta, Ga., assignor of forty-nine one-hundredths to Van Foster Fields, Atlanta, Ga.

Application July 6, 1948, Serial No. 37,220

2 Claims. (Cl. 220—18)

This invention relates to cooking utensils and similar devices, and more particularly to such devices having legs or supports removably attached thereto. The invention will be herein illustrated as embodied in a frying pan.

It is of particular advantage for campers and others using cooking utensils over an open fire to have the utensil supported above the fire on legs which are securely attached to the utensil itself so that the utensil will stand in place over the flame and may also be removed from the flame and still support itself so that the utensil proper will not have to be placed upon the ground or other support in the woods where fire hazards are prevalent. It is also desirable to have the legs removably attached so that the utensil can be used without the legs and in such condition present an unobstructed bottom surface for resting upon a stove or other heating element.

It is an object of my invention to provide a cooking utensil with removable legs.

It is a further object of my invention to provide a cooking utensil with removable legs which are attached in such manner as to provide a lowered center of gravity.

It is a further object of my invention to provide a cooking utensil with legs removably attached in such manner that the utensil may be conveniently supported above an open fire, or removed from the fire and supported above the ground as desired; and which also presents an unobstructed lower surface for resting upon a stove or other heating element when the legs have been removed.

Other and further advantages of my invention will be apparent from the following description taken in connection with the accompanying drawings in which like characters of reference designate similar parts throughout the several views, and wherein:

Fig. 1 is a plan view of a frying pan embodying my invention.

Fig. 2 is a perspective view of the utensil shown in Fig. 1.

Fig. 3 is a fragmentary elevation of one of the removable legs.

Fig. 4 is a fragmentary detail showing one of the lugs to which a leg is attached.

The utensil shown in the drawings comprises a frying pan having an unobstructed bottom portion 10, surrounded by an upstanding side 11 to which is attached a handle 12. The side 11 may be provided with one or more pouring spouts 11, as is customary. Also attached to the side 11 or formed integrally therewith are a plurality of lugs 13 arranged and adapted to receive the legs or supports 14. Each of the legs 14 is provided on the surface thereof with an upstanding transverse rib 15 designed to be received and snugly retained in a co-operating transverse groove 16 formed in the under side of each of the lugs 13. Also, each of the legs 14 is provided with a fastening means comprising a threaded member 17 and a cooperating wing nut 18. The threaded member 17 is designed to be received within a slot or other opening 19 provided in each of the lugs 13, and the legs are clamped in place by screwing the wing nuts 18 securely against the lugs 13 and thereby drawing the upstanding ribs 15 snugly and securely into the slot 16.

According to my invention, the cooking utensil is provided with legs or supports which are easily attached or removed, as desired. The means for attaching the legs to the utensil are provided at or near the upper edge of the utensil which thereby lowers the center of gravity while providing a maximum of desired clearance beneath the utensil for a fire. As shown in the drawing, three legs are provided so that the utensil may be supported safely on the ground or other uneven base material. To remove the legs from the utensil, it is merely necessary to loosen the wing nuts 18 sufficiently so that the ribs 15 will clear the slots 16, and the legs may then be taken off by withdrawing the threaded members 17 from the slots 19. With the legs removed, the cooking utensil according to my invention presents an unobstructed bottom portion for resting upon a stove or other heating element, and the lugs 13 remaining attached to or formed integrally with the utensil offer little or no obstruction or objectionable feature.

It will be realized that many changes and modifications of the apparatus herein illustrated can be made without departing from the scope of my invention as defined in the appended claims.

I claim:

1. In a cooking utensil having an unobstructed bottom portion surrounded by an upstanding side, a plurality of slotted lugs spaced about the upper edge of said upstanding side and projecting therefrom, a groove formed in each of said lugs, a plurality of supporting legs one removably attached to each of said lugs, said legs being provided respectively with a fastening member received in one of said slotted lugs and with a rib cooperating with and fitted into one of said grooves to hold said legs securely in place on said lugs.

2. In a cooking utensil having an unobstructed bottom portion surrounded by an upstanding side provided with a handle and a pouring spout, a plurality of slotted lugs formed integrally with said upstanding side and spaced about the upper edge thereof and projecting therefrom, a transverse groove formed in the under side of each of said lugs, a plurality of supporting legs one removably attached to each of said lugs, said legs being provided respectively with a threaded fastening member received in one of said slotted lugs and with a transverse rib cooperating with and fitted into one of said grooves to hold said legs securely in place on said lugs.

LOUIS F. MOTE.

REFERENCES CITED

The following references are of record in the file of this patent:

UNITED STATES PATENTS

| Number | Name | Date |
|---|---|---|
| 1,142,587 | Ledbetter | June 8, 1915 |